United States Patent [19]

Wallmark

[11] Patent Number: 4,716,654

[45] Date of Patent: Jan. 5, 1988

[54] DEVICE FOR BRAKING THE SAW CHAIN OF A PORTABLE POWER SAW

[76] Inventor: Kenneth Wallmark, Flottiljvagen 19, S-392 77 Kalmar, Sweden

[21] Appl. No.: 913,664

[22] PCT Filed: Nov. 18, 1985

[86] PCT No.: PCT/SE85/00460

§ 371 Date: Sep. 24, 1986

§ 102(e) Date: Sep. 24, 1986

[87] PCT Pub. No.: WO86/04294

PCT Pub. Date: Jul. 31, 1986

[30] Foreign Application Priority Data

Jan. 29, 1985 [SE] Sweden ................................ 8500400

[51] Int. Cl.[4] ........................ B23D 57/02; B23D 59/00

[52] U.S. Cl. .................................... 30/383; 188/77 R

[58] Field of Search .................................. 30/381–387, 30/122, 500; 188/77 R

[56] References Cited

U.S. PATENT DOCUMENTS 4,077,125 3/1978 Fuller .................................... 30/382

*Primary Examiner*—Douglas D. Watts

*Attorney, Agent, or Firm*—Fleit, Jacobson, Cohn & Price

[57] ABSTRACT

A device for braking the saw chain (3) of a portable power saw (1). The power saw has a front handle (5) to be gripped by one hand (6) of the saw operator, and a rear handle (7) to be gripped by the operator's other hand (8). The device includes a brake means (11) capable of braking the saw chain (3) by means of an actuating member (12). This may have the shape of an L-shaped tube (12) which is connected to a kickback guard (9)on the power saw, and which can be operated by the operator's rear hand as a result of a coercion wrenching movement of the rear hand (8) if any kick-back of the power saw will occur.

3 Claims, 6 Drawing Figures

DEVICE FOR BRAKING THE SAW CHAIN OF A PORTABLE POWER SAW

TECHNICAL FIELD

The present invention relates to a device for braking the saw chain of a portable power saw, the saw having a front handle to be gripped by one hand of the saw operator, and a rear handle to be gripped by the operator's other hand, below referred to as the rear hand, the device having a brake means capable of braking the saw chain by means of an actuating member arranged to be operated by the saw operator.

BACKGROUND ART

When using a portable power saw there is a risk of so called kickback accidents, i.e. the saw sword with its saw chain is violently swung upwards so that it hits the saw operator. This type of accident often seriously injures the saw operator's head, arms or upper body.

In order to reduce the risk of kickback accidents, the power saw is often provided with a chain braking device which is actuated as a result of a kickback. The chain braking device is usually actuated by a so called kickback guard. The construction of such kickback guards are based upon the observation that the saw operator's front hand will fail to maintain its grip against the front handle of the power saw during a kickback. Therefore, the kickback guard consists of a safety handle or safety "glove" being pivotably mounted in front of the the front handle and intended to catch the front hand if it will loose its grip due to a kickback. The hand thereby impacts the kickback guard with a force which will be transmitted to a brake means, for instance a brake band, which will brake the coupling drum and thereby brake the saw chain. In some power saws the motion of the kickback guard is arranged also to release the drive motor of the saw from the coupling drum.

However, it has turned out that the saw operator's front hand does not always hit the kickback guard with sufficient force in order to actuate the chain braking device.

In order to solve this problem it has been suggested to provide an automatic saw chain braking device which is actuated as a response to a detection of a predetermined angle of kickback, i.e. without having to affect the kickback guard. These automatic chain braking devices are, however, rather complicated and expensive, and they cannot be mounted on existing power saws.

SUMMARY OF THE INVENTION

The object of the present invention is to provide a device of the aforesaid kind which does not require any co-operation of the saw operator's front hand, and which does not require any complicated automatic equipment, but which is of simple construction and capable of being mounted on existing power saws. This object is achieved by the braking device constructed in accordance with the present invention and having the characteristic features set forth in claim 1.

Further developments of the invention are set forth in the depending claims.

The present invention is based upon the observation that the rear arm of the saw operator will at least initially remain in its initial position when a kickback occurs, whereas the rear hand, which grips on the rear handle, will be wrenched relative to the saw operator's arm. This is due to physiological reasons according to which the hand can very easily be wrenched about the wrist from a physiological normal position, in which the hand and the arm are on a line with one another, upwards in approximately 30° to a distinct stop in the wrist. Accordingly, the saw operator's rear hand will, if a kickback occurs, initially be wrenched—together with the power saw—relative to the saw operator's arm. The saw operator's hand grip on the rear handle will initially be maintained due to a cramp contraction of muscles, but will then successively open, beginning from the little finger side of the hand. Only when the hand has been displaced by a wrenching about the wrist to said distinct stop, i.e. after a wrenching movement of approximately 30°, the saw operator's arm will be able to rotate upwards. However, at this time the power saw will often have swung so far upwards that the saw chain has already hit the saw operator's head. The upward movement of the power saw is, therefore, substantially a rotary motion with the centre of rotation being located approximately at the centre at the rear handle, i.e. in or in the vicinity of the rear hand.

Accordingly, the aim of the invention is to use the physiological coercion wrenching movement of the rear hand in order to actuate the saw chain braking device. This aim is achieved by locating the actuating member in such a position relative to the rear handle that it can be operated by the operator's rear hand as a result of a wrenching movement of the rear hand relative to the rear arm of the saw operator if a kickback of the power saw will occur.

BRIEF DESCRIPTION OF THE DRAWINGS

The invention will be described in more detail with reference to a preferred embodiment thereof illustrated in the accompaying drawings; in which FIG. 1 is a perspective view of a normal working position when using a conventional portable power saw, whereas

DESCRIPTION OF A PREFERRED EMBODIMENT

Figure 1:
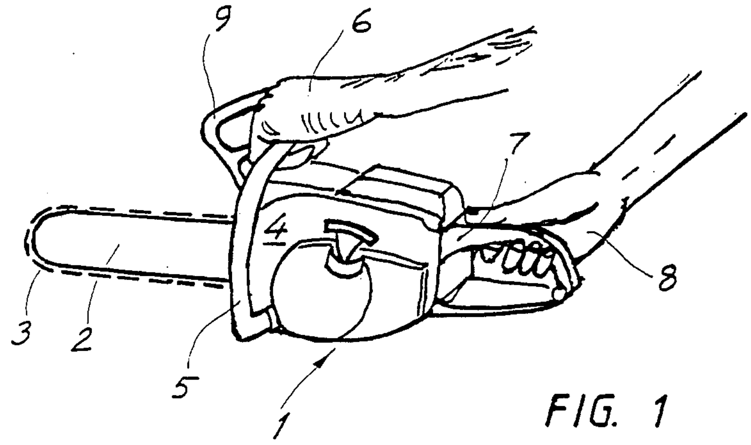

FIG. 1 illustrates a normal working position for a conventional portable power saw 1 having a sword 2 and a saw chain 3. A housing 4 for the saw is provided with a front handle 5 which is to be gripped by one hand 6 of the saw operator, and a rear handle 7 to be gripped by the other, rear hand 8 of the saw operator. For a better understanding of the physiological positions of the hands 6 and 8, these have been shown without safety gloves, although such of course should be used by the saw operator.

Figure 5:
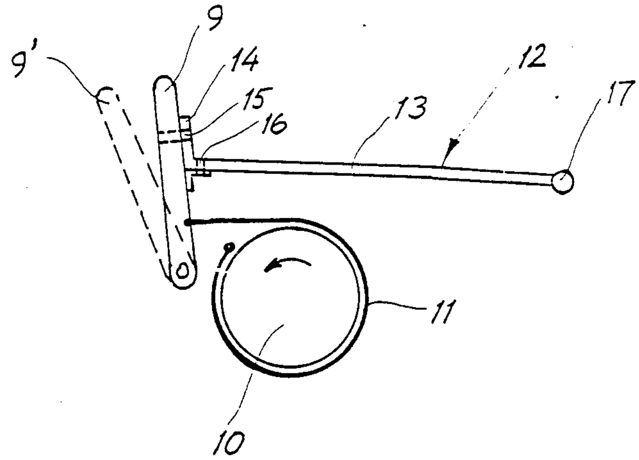
FIG. 5 illustrates schematically a side view of a braking device in accordance with the invention and operatively connected with a brake means for the saw chain.

The power saw is further provided with a conventional kickback guard in the shape of a safety or parry handle 9 being pivotably mounted in the housing 4 in front of the front handle 5. The actuating function of the safety handle 9 is schematically shown in FIG. 5. The safety handle 9 is connected to one end of a brake band 11 extending entirely or partly circular about a coupling drum 10 that drives the saw chain 3. In its repose position, shown in FIG. 5, the brake band has been brought out of contact with the coupling drum 10. When subjected to a forward movement, for instance due to a kickback the safety handle 9 will be displaced to the position 9' shown in a dashed line in FIG. 5, this displacement causing the brake band 11 to be brought into contact with the coupling drum 10 such that the motion of the saw chain 3 will be stopped.

Figure 2:
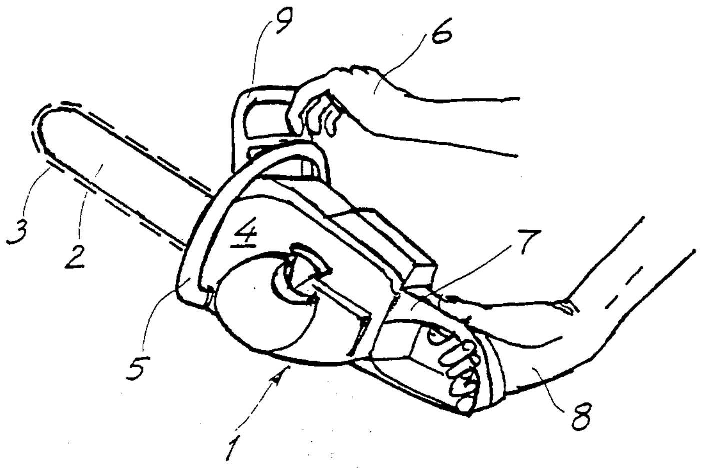
FIG. 2 illustrates the conventional power saw during a kickback.

FIG. 2 illustrates how the front hand 6, during a kickback, fails to maintain its grip on the front handle 5. The hand 6 is thereby caught by the safety handle 9 which is thus affected by the hand 6 by an impact force which brakes the saw chain in the manner described above.

Figure 3A:
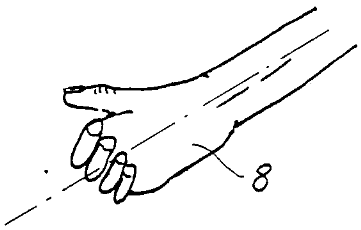
FIGS. 3*a* and 3*b* illustrate the saw operator's rear hand in a normal working position, and during a kickback, respectively.
Figure 3B:
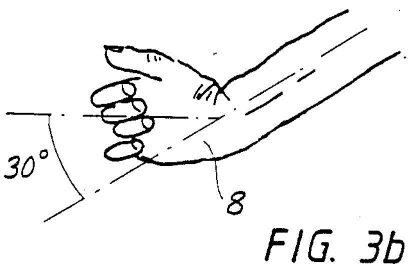

The rear hand 8 of the saw operator will grip on the rear handle 7 only by a cramp contraction of muscles during the kickback, but will wrench from a normal position, shown in FIGS. 1 and 3*a* to a stop position that is determined by the physiological properties of the hand, shown in FIGS. 2 and 3*b*. This wrench extends over an angle of approximately 30°.

Figure 4:
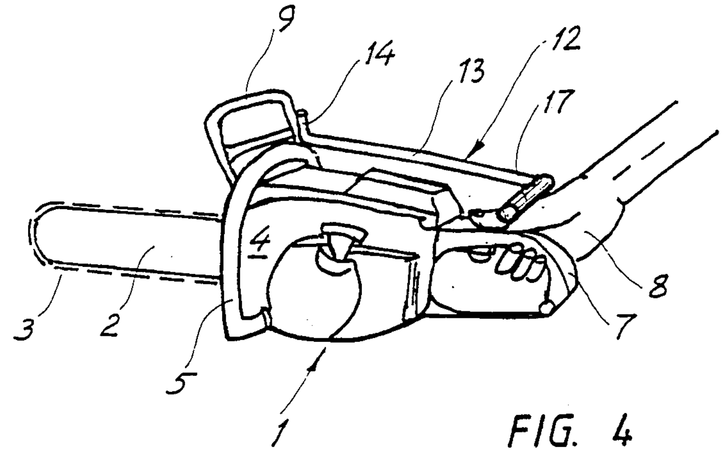
FIG. 4 is a perspective view of a conventional portable power saw being provided with a braking device in accordance with the invention.

The above-mentioned wrench of the saw operator's rear hand is used, according to the present invention, in order to operate an actuating member which is capable of actuating a brake means for the saw chain. The actuating member is shown in FIGS. 4 and 5 in the form of an L-shaped metal tube 12, one shank 13 of which having its free end 14 being angularly bent and rigidly connected to the safety handle 9 by means of two screws or rivets 15 and 16. The other shank 17 of the L-shaped tube 12 is orientated with its lengthwise direction extending substantially perpendicular to the plane of the saw sword 2, and extending a few millimeters above the back of the rear hand 8. It has turned out that the wrench of the hand 8 that will occur during a kickback, in the manner described above, is sufficient to affect the shank 17 with such an upwardly directed force that the end 14 of the L-shaped tube 12 will transmit a forwardly directed force to the safety handle 9, thereby displacing the same forwardly to the position shown in dashed lines in FIG. 5. The wrench of the hand 8 will thereby cause a braking of the saw chain 3 which, in conventional power saws, instead is achieved by a catching of the front hand against the safety handle 9.

It will be apparent that the actuating member 12 may have a shape different to the L-shape illustrated. Accordingly, any other means which is capable of detecting a wrench of the rear hand may be used for actuating the chain braking device in accordance with the invention. In the embodiment shown the actuating member 12 is operated by the back of the hand, but it may alternatively be operated by the front part of the hand or by the palm.

In the embodiment shown in FIG. 5 the safety handle 9 acts directly on the brake band 11. It is also conceivable, in an alternative embodiment, to connect the handle 9 or the actuating member 12 to the brake band 11 via a biased latch which is held by a spring and which is to be released by the handle 11 or by the member 12 as a result of a kickback, such that the brake band 11 will be brought into contact with the coupling drum 10. In this case the latch must, of course, again be biased before the power saw can be used again. Such latches are known per se in conjunction with saw chain braking devices for power saws, and are, therefore, not illustrated here.

In an alternative embodiment, not shown, the actuating member 12 is not secured to the safety handle, but is instead mounted on the housing 4 in a manner to enable it to be displaced by the wrenching movement of the rear hand. The actuating member is then preferably pivotably mounted on the housing 4 and operatively connected to a pneumatic, hydraulic or electronic means capable of being operated as a result of a pivoting movement of the actuating member caused by the wrenching of the rear hand of the operator. Such means are known per se to those skilled in the art and are, therefore, not shown or described in detail.

I claim:

1. A device for braking a saw chain of a portable power saw, the saw having a front handle (5) to be gripped by a front hand of a saw operator, and a rear handle (7) to be gripped by a rear hand of the saw operator, the device having a brake means (11) which brakes the saw chain, said brake means being actuated by means of an actuating member (12), arranged to be operated by the saw operator, characterized in that the actuating member (12) comprises an elongated lever, one end of which is connected by a kickback guard to the brake means, the other end of which is located adjacent to the rear handle so that it is operated by the rear hand (8) of the saw operator to actuate said brake means as a result of a wrenching movement of the rear hand relative to the rear arm of the operator when kickback of the power saw occurs.

2. A device according to claim 1, characterized in that the kickback guard (9) is intended to be caught by the front hand of the saw operator, the actuating member (12) being operatively connected to the kickback guard.

3. A device according to claim 2, characterized in that the actuating member (12) substantially has the shape of an L-shaped arm including two shanks, one shank (17) of which is intended to be operated by the rear hand (8) of the saw operator, a free end of the other shank (13) of the L-shaped arm being connected to the kickback guard so as to constitute an operative connection with the kickback guard.

* * * * *